(12) United States Patent
Ravishankar et al.

(10) Patent No.: US 7,580,424 B2
(45) Date of Patent: Aug. 25, 2009

(54) SYSTEM AND METHOD FOR PROVIDING REAL-TIME AND NON-REAL-TIME SERVICES OVER A COMMUNICATIONS SYSTEM

(75) Inventors: Channasandra Ravishankar, Germantown, MD (US); Abheek Saha, New Delhi (IN); Saurabh Garg, Tampere (FI); Michael Darcy, Griesheim (DE)

(73) Assignee: Hughes Network System, LLC, Germantown, MD (US)

( * ) Notice: Subject to any disclaimer, the term of this patent is extended or adjusted under 35 U.S.C. 154(b) by 1256 days.

(21) Appl. No.: 10/245,196

(22) Filed: Sep. 17, 2002

(65) Prior Publication Data
US 2003/0060210 A1 Mar. 27, 2003

Related U.S. Application Data

(60) Provisional application No. 60/324,560, filed on Sep. 25, 2001.

(51) Int. Cl.
*H04J 3/16* (2006.01)
*H04W 72/00* (2009.01)

(52) U.S. Cl. .................... 370/468; 455/452.2

(58) Field of Classification Search ............... 370/310, 370/328, 336–338, 351–356, 358, 391, 345, 370/442–444, 464–468; 714/18, 745–752; 455/403, 422.1, 450–452.2, 454, 67.11, 67.13
See application file for complete search history.

(56) References Cited

U.S. PATENT DOCUMENTS

| | | | | |
|---|---|---|---|---|
| 5,828,653 A * | 10/1998 | Goss | | 370/230 |
| 6,574,224 B1 * | 6/2003 | Brueckheimer et al. | .. | 370/395.6 |
| 6,640,248 B1 * | 10/2003 | Jorgensen | | 709/226 |
| 6,707,821 B1 * | 3/2004 | Shaffer et al. | | 370/395.4 |
| 6,711,141 B1 * | 3/2004 | Rinne et al. | | 370/328 |
| 6,747,986 B1 * | 6/2004 | Charas et al. | | 370/465 |
| 6,862,622 B2 * | 3/2005 | Jorgensen | | 709/226 |
| 7,023,820 B2 * | 4/2006 | Chaskar | | 370/329 |
| 7,272,115 B2 * | 9/2007 | Maher et al. | | 370/253 |
| 2002/0072333 A1 * | 6/2002 | Gnesda et al. | | 455/67.1 |
| 2002/0188732 A1 * | 12/2002 | Buckman et al. | | 709/228 |

OTHER PUBLICATIONS

3GPP TS 23.060 v.3.8.0 "General Packet Radio Service (GPRS); Service description; Stage 2," Jun. 2006, pp. 1 and 16.*

* cited by examiner

*Primary Examiner*—Aung S Moe
*Assistant Examiner*—Kerri M Rose
(74) *Attorney, Agent, or Firm*—K&L Gates, LLP

(57) ABSTRACT

A method, system, and computer program product for providing communications services, including determining a type of communications service present in a communications session based on quality of service parameters assigned for the communications session; and adjusting the quality of service parameters based a different type of communications service requested. The types of communications services include real-time and non-real-time communications services.

12 Claims, 8 Drawing Sheets

SYSTEM AND METHOD FOR PROVIDING REAL-TIME AND NON-REAL-TIME SERVICES OVER A COMMUNICATIONS SYSTEM

CROSS REFERENCE TO RELATED CASES

The present invention claims the benefit of priority under 35 U.S.C. § 119(e) to U.S. Provisional Patent Application No. 60/324,560 of Ravishankar et al., entitled "SYSTEM AND METHOD FOR CARRYING VOICE OVER SATELLITE BASED GPRS SYSTEM," filed on Sep. 25, 2001, the entire contents of which is incorporated by reference herein.

FIELD OF THE INVENTION

The present invention generally relates to communications systems and more particularly to a method and system for carrying various real-time and non-real-time services over a communications system, such as a General Packet Radio Service (GPRS) communications system.

DISCUSSION OF THE BACKGROUND

In recent years, communications systems, such as GPRS systems, have been implemented to provide wireless connectivity between a client (e.g., a laptop computer, Personal Digital Assistant (PDA), handheld device, etc.) and a server in an external packet data network for supporting mobile users. Generally, GPRS caters to providing access to various types of networks supporting various types of Packet Data Protocols (PDPs) including, for example, Internet Protocol (IP).

End-user devices employed in GPRS systems typically include Terminal Equipment (TE) and a Mobile Terminal (MT). The TE runs applications and the MT interfaces to the TE on one side and a Base Station Subsystem (BSS) of the GPRS system on the radio side. The radio interface between the MT and the BSS typically is referred to as an air-interface.

However, the GPRS specification (e.g., GPRS-97) allows for establishment of only a single PDP context per PDP address (e.g., per IP address). This implies that for typical scenarios where the TE handles a single IP address, a single context and hence one set of Quality of Service (QoS) parameter values can be established between the MT and a Serving GPRS Support Node (SGSN) of the GPRS system. This can be unattractive since various applications running concurrently on the TE (e.g., real-time voice and non-real-time data applications) may require a different set of QoS parameter values for optimal performance.

Therefore, there is a need for an improved communications system and method that overcomes problems with respect to varying QoS requirements between multiple applications.

SUMMARY OF THE INVENTION

The above and other needs are addressed by the present invention, which provides an improved method and system for providing for providing communications services. In one embodiment, a type of communications service present in a communications session is determined based on quality of service (QoS) parameters assigned for the communications session. The quality of service parameters then are adjusted based a different type of communications service requested. The types of communications services include real-time (e.g., a voice over Internet Protocol [VoIP], video/audio on demand, etc.) and non-real-time (e.g., data, web browsing, FTP, etc.) communications services. The services are provided in a communications system, such as a General Packet Radio Service (GPRS) communications system. In other embodiments, first QoS parameters are activated for the data services, and second QoS parameters are activated for the VoIP services, over the communications system. In additional embodiments, same QoS parameters are retained for both the data and the VoIP services; QoS parameters are concurrently provisioned for both the data and the VoIP services; different temporary block flows (TBFs) are generated for the data services and the VoIP services, respectively; a TBF is determined to be for the VoIP services if it is established in an unacknowledged radio link control (RLC) transport mode; a compressed IP voice packet is generated for the VoIP services; packets having an unacknowledged RLC transport mode are assigned higher priority than packets having an acknowledged RLC transport mode; and a header field is eliminated in communications between a mobile terminal and a base station; respectively.

Accordingly, in one aspect of an embodiment of the present invention there is provided a method, system and computer program product for providing communications services, including determining a type of communications service present in a communications session based on quality of service parameters assigned for the communications session; and adjusting the quality of service parameters based a different type of communications service requested. The types of communications services include real-time and non-real-time communications services.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

A method and system for providing real-time and non-real-time services over a communications system, such as a General Packet Radio Service (GPRS) communications system, are described. In the following description, for purposes of explanation, numerous specific details are set forth in order to provide a thorough understanding of the embodiments of the present invention. It is apparent to one skilled in the art, however, that the embodiments of the present invention can be practiced without these specific details or with and equivalent arrangement. In some instances, well-known structures and devices are shown in block diagram form in order to avoid unnecessarily obscuring the embodiments of the present invention.

Figure 1:
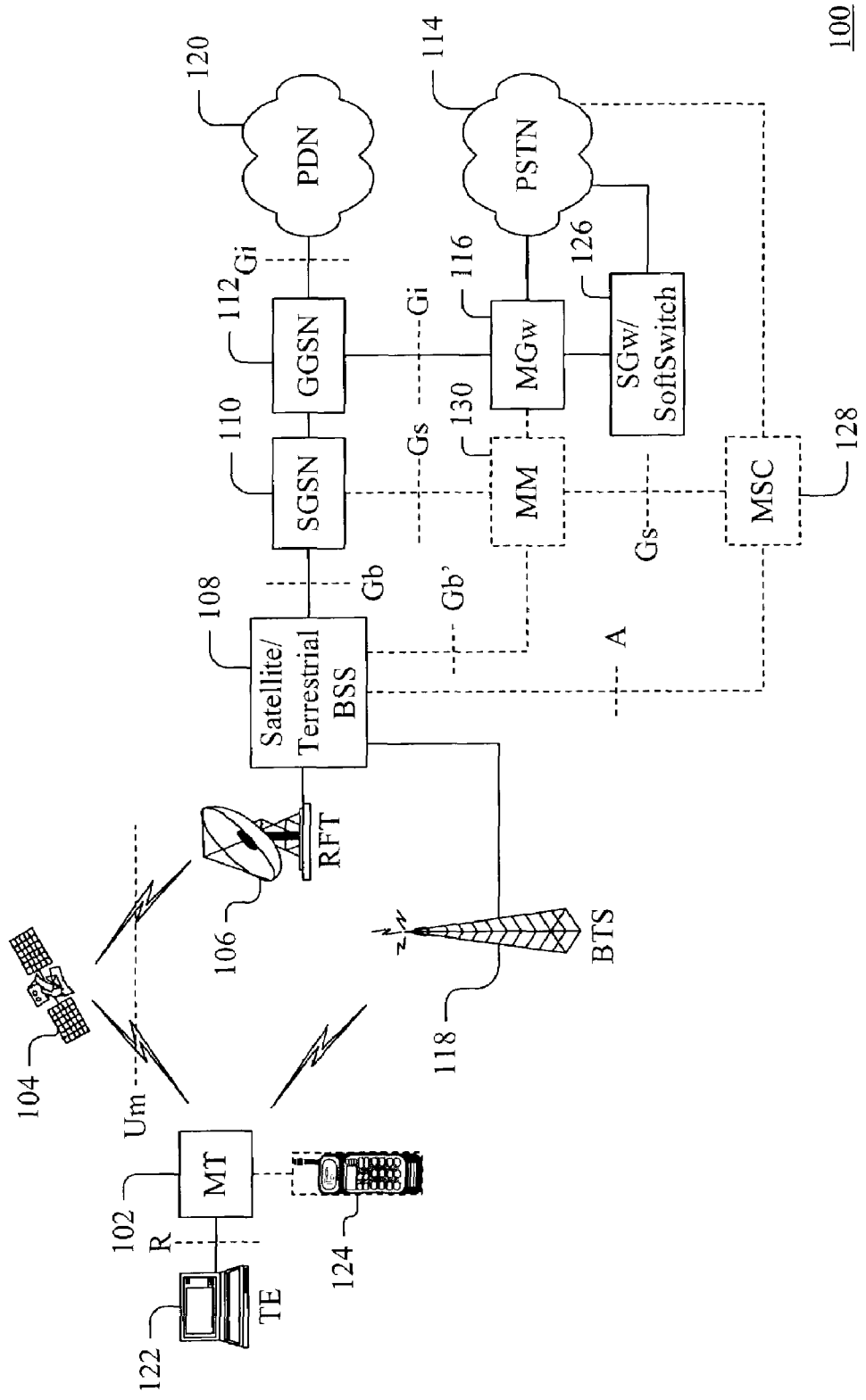
FIG. 1 is a system diagram for illustrating a General Packet Radio Service (GPRS)-based satellite and terrestrial network communications system.

Referring now to the drawings, wherein like reference numerals designate identical or corresponding parts throughout the several views, and more particularly to FIG. 1 thereof, there is illustrated a communications system, e.g., a GPRS-based satellite and terrestrial network system 100, according to an embodiment of the present invention. In FIG. 1, the system 100 includes one or more end-user devices typically including a Terminal Equipment (TE) 122 (e.g., a laptop computer, PDA, etc.) and a Mobile Terminal (MT) 102 (e.g., a wireless modem, cellular phone, wireless PDA, satellite modem, etc.). The TE 122 runs applications (e.g., voice and data applications) and the MT 102 interfaces to the TE 122 on one side and a satellite and/or terrestrial Base Station Sub-System (BSS) 108 as the case may be. The radio interface between the MT 102 and the BSS 108 typically is referred to as an air interface.

In FIG. 1, termination at the user end can be supported through the TE 122 employing a software vocoder or alternatively a vocoder can be implemented as part of the MT 102 with a wired (e.g., RJ-11) or wireless (e.g., Bluetooth) interface to a voice handset 124. Radio connectivity between the MT 102 and the BSS 108 can be implemented via a terrestrial cellular communications system by employing a Base Transceiver System (BTS) 118 coupled to the terrestrial BSS 108. Radio connectivity between the MT 102 and the BSS 108 can be implemented via a satellite communications system by employing a Radio Frequency Terminal (RFT) 106 coupled to the satellite BSS 108. In this way, end-user devices can be implemented to support terrestrial cellular communications and/or satellite communications.

As shown in FIG. 1, the system 100 further includes a SGSN 110, a Gateway GPRS Support Node (GGSN) 112, a Media Gateway (MGw) 116, and a Signaling Gateway (SGw)/SoftSwitch 126. The GGSN 112 provides signaling and data connectivity between the SGSN 110 and a Packet Data Network (PDN) 120. The MGw 116 provides media (e.g., voice, data, etc.) connectivity between the GGSN 112 and a Public Switched Telephone Network (PSTN) 114. The SGw/SoftSwitch 126 provides signaling connectivity between the GGSN 112 and the PSTN 114.

In an alternative embodiment, a Mobility Management (MM) SoftSwitch 130 can be coupled between the MGw 116 and the BSS 108 and the SGSN 110, as shown in FIG. 1. With this embodiment, the MGW 116 path to the PSTN 114 can bypass the GSN elements 110 and 112, with the MM 130 including software for emulating Mobile-Services Switching Center (MSC) MM signaling.

In a further alternative embodiment, a MSC 128 (e.g., a Global System for Mobile Communications [GSM] MSC) can be coupled between the PSTN 114 and the BSS 108 and the SGSN 110, as shown in FIG. 1. With this embodiment, the MGw 116 and the SGw/SoftSwitch 126 are not employed, with the BSS 108 supporting interconnection to the MSC 128. Advantageously, a low-cost, small-sized GSM MSC product can be employed to provide a cost-effective alternative for supporting voice channel capacities on the order of thousands of circuits.

The devices and subsystems of the system 100 of FIG. 1 can include any suitable servers, workstations, personal computers (PCs), laptop computers, PDAs, Internet appliances, set top boxes, modems, handheld devices, other devices, etc., capable of performing the processes of the embodiments of the present invention. The devices and subsystems can communicate with each other using any suitable protocol and can be implemented using the computer system 501 of FIG. 5, for example. One or more interface mechanisms can be used in the system 100 including, for example, Internet access, telecommunications in any form (e.g., voice, modem, etc.), wireless communications media, etc. The communications networks 114 and 120 can include, for example, the Internet, an Intranet, etc.

Figure 2A:
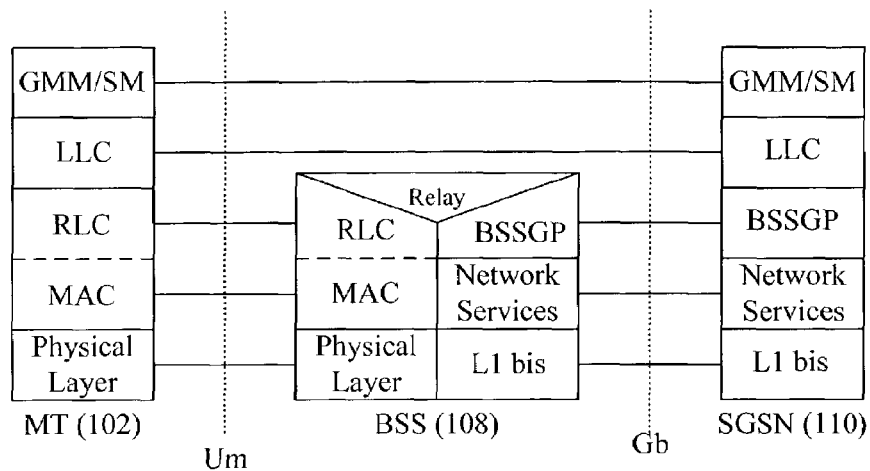
FIGS. 2a and 2b are diagrams for illustrating protocol stacks on a control plane and on a user plane implemented across various subsystems of FIG. 1.
Figure 2B:
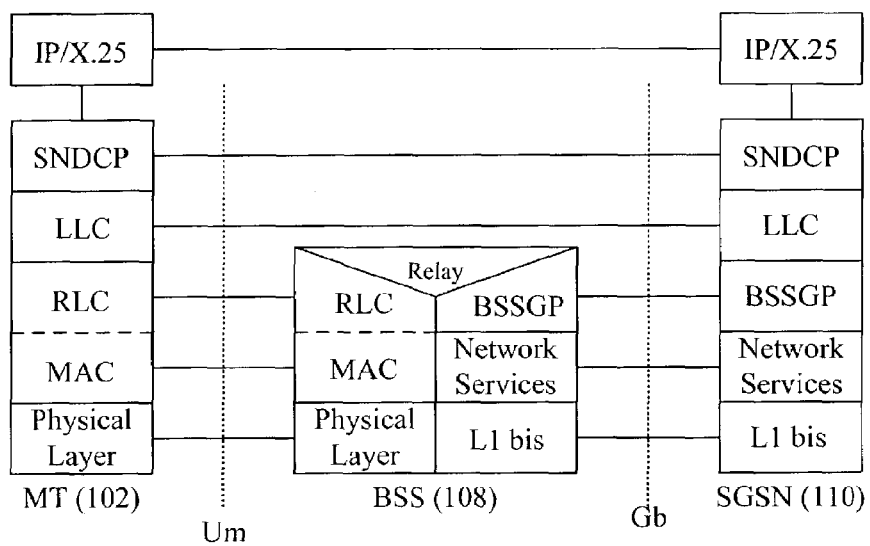

It is to be understood that the system 100 shown in FIG. 1 is for exemplary purposes only, as many variations of the specific hardware used to implement the embodiments of the present invention are possible, as will be appreciated by those skilled in the relevant art(s). For example, the functionality of devices and subsystems of the system 100 can be implemented via one or more programmed computer systems or devices. To implement such variations as well as other variations, a single computer system (e.g., the computer system 501 of FIG. 5) can be programmed to perform the special purpose functions of one or more of the devices and subsystems of the system 100. On the other hand, two or more programmed computer systems or devices can be substituted for any one of the devices and subsystems of the system 100. Principles and advantages of distributed processing, such as redundancy, replication, etc., also can be implemented as desired to increase the robustness and performance of the system 100, for example. FIGS. 2a and 2b illustrate protocol stacks on a control plane and a user plane implemented across various subsystems of the system 100 of FIG. 1.

Packet transfers inside the GPRS system 100 are on a packet bearer, where a concept of Temporary Block Flows (TBFs) is established between the MT 102 and the BSS 108 and which is demand based. A user establishes a Packet Data Protocol (PDP) context between the MT 102 and the SGSN 110 that reflects the QoS parameters negotiated between MT 102 and the SGSN 110 as well as information about a point of access to the external world for the MT 102.

Figure 3A:
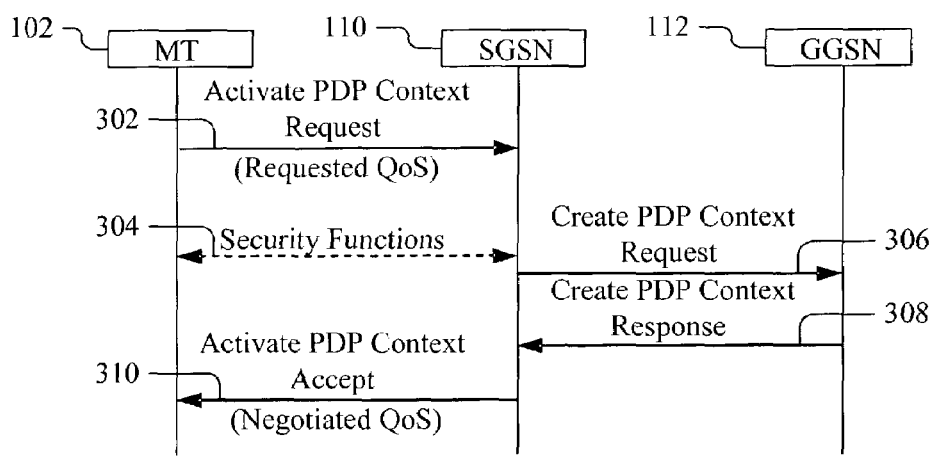
FIG. 3a is a signal flow diagram for illustrating Packet Data Protocol (PDP) context activation.

FIG. 3a is a signal flow diagram for illustrating the PDP context activation process. In FIG. 3a, the MT 102 sends an Activate PDP Context Request message for a requested QoS to the SGSN 110 (step 302). Security functions are performed between the MT 102 and the SGSN 110 (step 304) and a Create PDP Context Request message is sent from the SGSN 110 to the GGSN 112 (step 306). The GGSN 112 sends a Create PDP Context Response message to the SGSN 110 (step 308). The SGSN 110 sends an Activate PDP Context Accept message for the negotiated QoS to the MT 102 (step 310), completing the PDP context activation process.

The QoS parameters used in the GPRS specification (e.g., GPRS-97) can include Delay Class, Peak Throughput Class, Mean Throughput Class, Precedence Class and Reliability Class. The Delay Class allows the user to request and specify a grade of service from the GPRS system 100 that reflects the delay sensitivity of the kind of application(s) that the user intends to use. The Peak Throughput class allows the user to specify peak rates that the TE 122 is capable of receiving or would like to receive. The Mean Throughput class allows the user to specify the average rate at which the TE 122 would like to receive. The precedence class allows the user to negotiate a priority that the GPRS system 100 should use for scheduling packets for transmission over the air interface. The Reliability Class allows the user to negotiate and specify whether acknowledged or unacknowledged mode of transfer is to be used across the air interface. Typically, the unacknowledged mode of operation is employed for real-time, time-sensitive, error tolerant applications (e.g., such as conversational voice, audio/video on demand, streaming audio/video, etc.) and acknowledged mode of operation for non-real-time, non-time-sensitive, error sensitive applications (e.g., web browsing, e-mail, File Transfer Protocol [FTP], etc.). Providing support for multiple types of communications (e.g., voice and data communications, etc.) over the GPRS-based system 100 of FIG. 100 will now be described with reference to FIGS. 1-4.

Dynamic QoS Provisioning

The embodiments of the present invention include recognition that that the GPRS specifications (e.g., GPRS-97) allows establishment of only a single PDP context per PDP address. Accordingly, this implies that for typical scenarios where TE 122 employs a single IP address, a single context and hence one set of QoS parameter values can be established between the MT 102 and the SGSN 110. This can lead to problems since various applications running concurrently on the TE 122 can require a different set of QoS parameter values for optimal performance.

Therefore, the end-user experiences sub-optimal performance for those applications for which the PDP context reflects QoS parameter values that are not optimal. As an example, if the user is running a non-real-time application, such as a web browsing, e-mail, FTP, etc., application and then switches to a real-time application, such as an IP voice call voice, audio/video on demand, streaming audio/video, etc., application, then the QoS parameters that are necessary for these two applications are vastly different. For example, if the PDP context is established for the web browsing application, then the performance of the IP voice application will suffer.

On the other hand, time-sensitive services, such as voice services, etc., need different treatment for their packets within the GPRS system 100. If the treatment given to time-sensitive services packets is also extended to the non-time-sensitive data services (e.g., FTP, e-mail, etc.) packets, this will not only scale down the capability of the system 100 to handle more users concurrently, this will also lower the radio resource utilization.

Figure 3B:
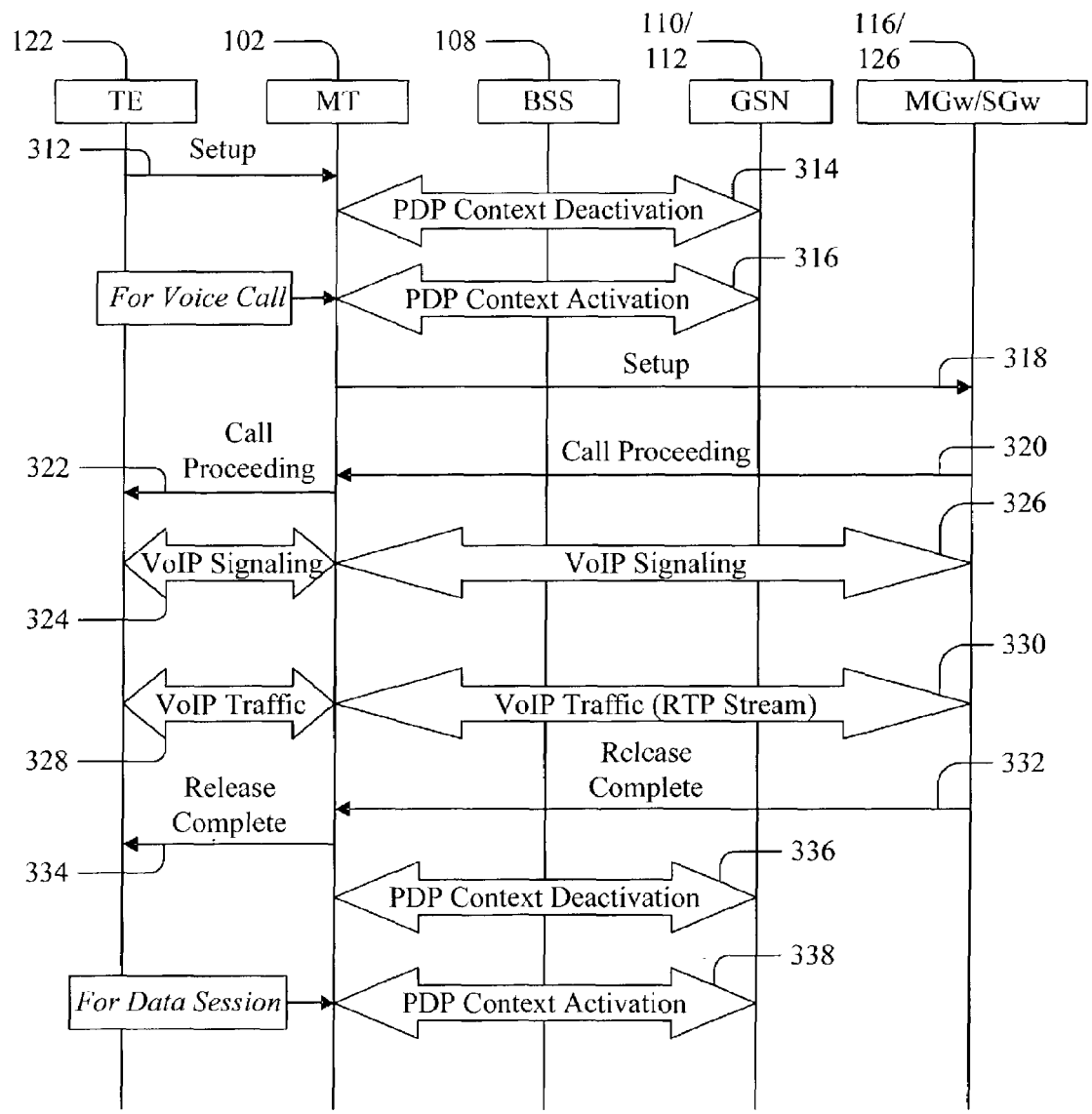
FIG. 3b is a signal flow diagram for illustrating a sequential voice/data call.

Accordingly, FIG. 3b is a signal flow diagram for illustrating a sequential voice/data call. In FIG. 3b, the MT 102 intercepts messages between client (e.g., the TE 122) and server (e.g., the MGw 116) and appropriately tears down the existing PDP context and re-establishes a new context applicable, for example, for real-time traffic, such as voice over IP (VoIP) signaling and traffic (steps 312-334). In this aspect of an embodiment of the invention, the MT 102 checks for the transport address in Realtime Transport Protocol (RTP)/User Datagram Protocol (UDP)/IP headers and invokes a deactivation of an existing PDP context (step 314), if the QoS parameter values of the existing PDP context are unable to support the real-time traffic. Subsequently, a new PDP context activation is initiated (step 316), where the MT 102 negotiates a set of QoS parameter values that are applicable for the real-time voice traffic (steps 318-330).

In a preferred embodiment, a most stringent Delay Class, a highest Precedence Class and a Reliability Class that operates in unacknowledged mode at Radio Link Control (RLC), Logical Link Control (LLC), and GPRS Tunneling Protocol (GTP) layers are employed during PDP context activation (step 316) for VoIP signaling and traffic. After the IP voice call, the MT 102 deactivates the real-time (e.g., voice) specific PDP context (step 336) and reactivates a PDP context applicable for non-real-time traffic (e.g., web browsing, step 338). The context activation and deactivation is also based on the MT 102 monitoring relevant Release Complete messages that transpire between the client (e.g., the MT 102) and the server (e.g., the MGw 116, steps 332 and 334). Advantageously, such an arrangement allows for optimal operation of sequential or alternate real-time and non-real-time applications running on the TE 122.

Alternate Embodiment for Dynamic QoS Provisioning

Figure 3C:
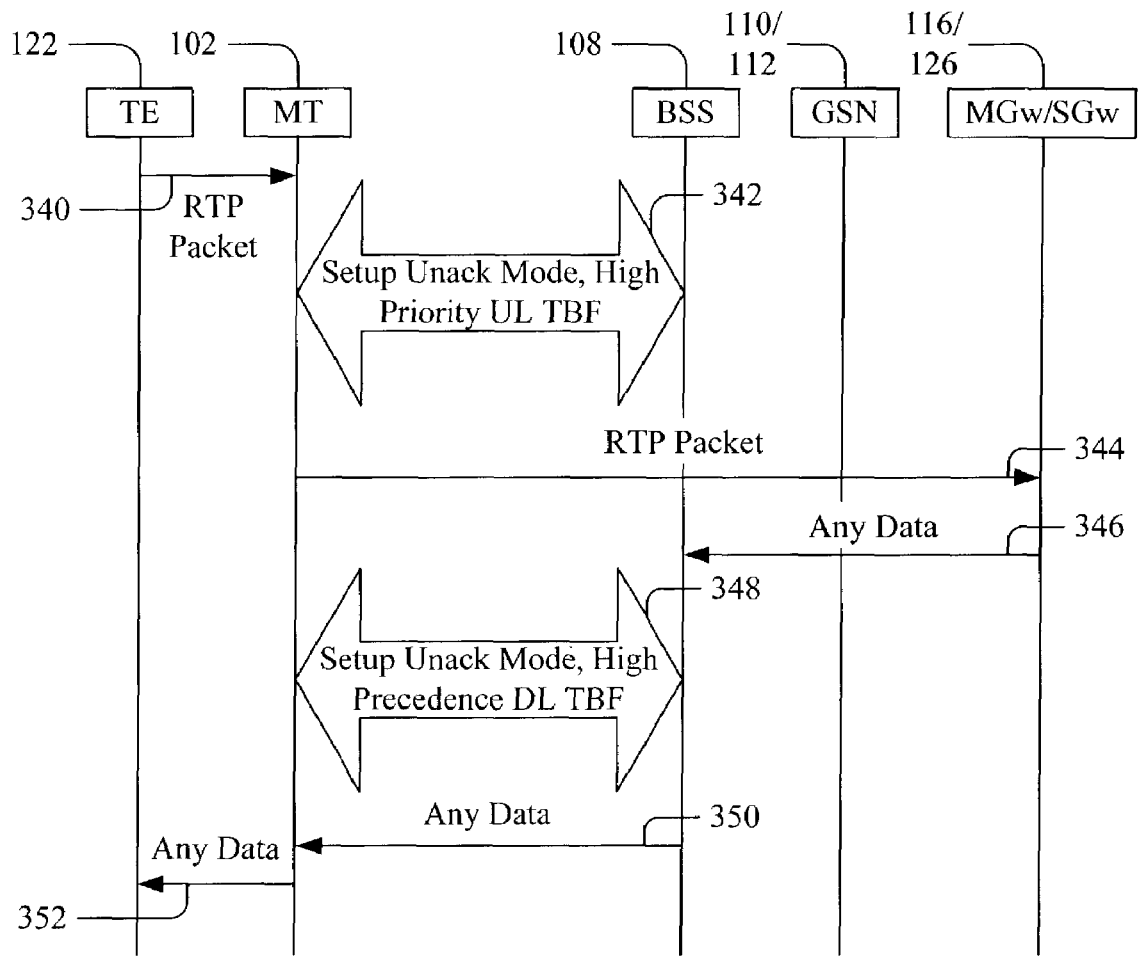
FIG. 3c is a signal flow diagram for illustrating setting up of a Temporary Block Flow (TBF) for real-time traffic.

FIG. 3c is a signal flow diagram for illustrating the setting up of TBF for real-time traffic, according to an alternate embodiment. In FIG. 3c, a PDP context applicable for non-real-time traffic is retained even when it is necessary to carry real-time traffic. However, the MT 102 informs the BSS 108 of its intention to establish a TBF for real-time traffic when the MT 102 detects an ensuing real-time transfer based on inspection of a transport address (step 342). The BSS 108 then treats all traffic from and to the MT 102 with the same priority as though a new PDP context was established (steps 344-352).

This technique allows for a faster adaptation of a scheduler for the new type of traffic, as opposed to the method of FIG. 3b that uses a new PDP context. However, this technique assumes that users establish PDP contexts for non-real-time traffic, such that the SGSN 110 behaves as a First Come First Serve (FCFS) scheduler for the real-time types of traffic. The BSS 108 would then have complete control of scheduling and prioritization in the system that then determines the QoS for real-time (e.g., voice) traffic.

Simultaneous QoS Provisioning

In the Alternate Embodiment for Dynamic QoS Provisioning section, optimal performance is achieved for real-time and non-real-time traffic in a sequential manner. However, many systems require simultaneous operation of both real-time and non-real-time traffic. Accordingly, simultaneous multiple PDP contexts for both real-time and non-real-time traffic are established according to another aspect of an embodiment of the invention.

As previously discussed, it is only possible to have a single PDP context per IP address for networks deploying the GPRS specification. This aspect of an embodiment of the present invention provides multiple simultaneous PDP contexts using multiple IP addresses. In this scenario, the MT 102 takes on the responsibility of mapping the multiple PDP addresses to a single IP address that the TE 122 can handle.

Figure 3D:
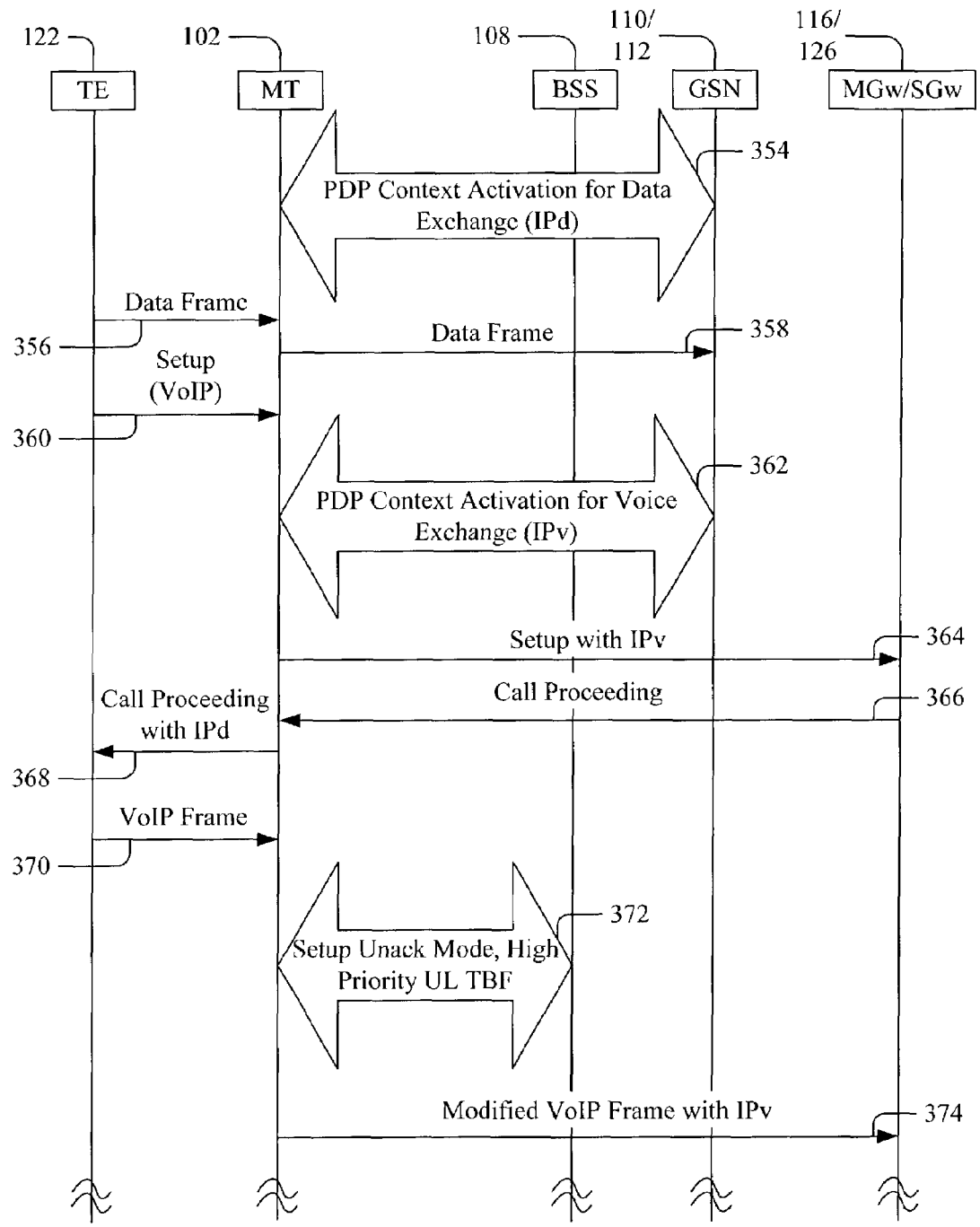
FIGS. 3d and 3e are a signal flow diagram for illustrating a simultaneous voice/data call, admission control in a Base Station Sub-System (BSS) and downlink Packet Data Unit (PDU) prioritization based on BSS visible Quality of Service (QoS)
Figure 3E:
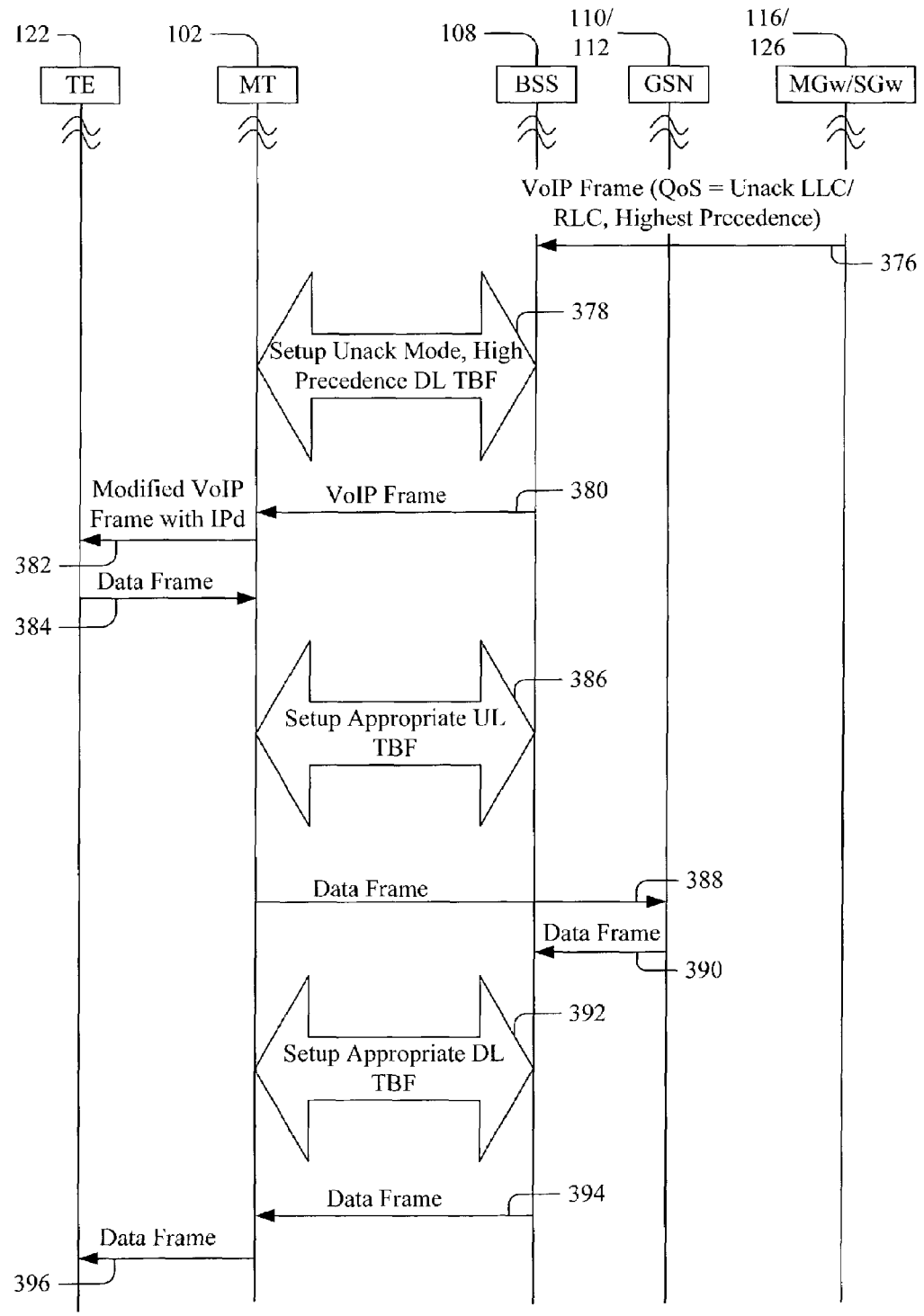

Accordingly, FIGS. 3d and 3e are a signal flow diagram for illustrating a simultaneous voice/data call, admission control in the BSS 108 and Downlink (DL) PDU prioritization based on the BSS 108 visible QoS. In FIGS. 3d and 3e, the MT 102 activates multiple PDP contexts with QoS parameter values relevant for voice (step 362) and non-voice traffic (step 354). The SGSN 110 treats traffic streams corresponding to the two IP addresses according to their negotiated QoS. The appropriate QoS parameters (Reliability Class and Precedence Class) are passed on from the SGSN 110 to the BSS 108 along with every LLC frame. The BSS 108 then uses this information for scheduling purposes and to determine RLC transmission mode.

Real-time messages, (e.g., VoIP messages, etc.) from the TE 122 are intercepted at the MT 102. On receiving the very first real-time message from the TE 122 (step 360), the MT 102 intercepts the message and initiates a PDP Context Activation with a special QoS (e.g., a most stringent Delay Class, a highest Precedence Class, a Reliability Class that operates in unacknowledged mode at RLC, LLC and GPRS Tunneling Protocol [GTP] layers, and high radio priority) that is reserved for the real-time (e.g., VoIP, etc.) services (step 362). After a successful PDP Context Activation (step 362), the MT 102 gets a new IP address (IPv). The new IP address (IPv) is used for the real-time message as they go from the MT 102 to the rest of the GPRS system 100 (step 364). In a return direction, messages destined to the new IP address (IPv) are modified by the MT 102 to have the device IP address (IPd) of the TE 122 as their destination address before being passed to the TE 122 (steps 366 and 368).

Thus, the MT 102 suitably modifies a setup message (e.g., a Setup message for H.323 or an Invite message for Session Initiation Protocol [SIP]) received from TE 122 (step 360) with the newly acquired IP address before transferring the setup message to the rest of the GPRS system 100 (step 364). The IP address (IPd) of the TE 122 is replaced with the newly acquired IP address (IPv, step 364).

In the reverse direction, the MT 102 modifies a response message (e.g., a Call Proceeding message for H.323 or an OK message for SIP) received from the system 100 (step 366) with the IP address (IPd) of the TE 122 (step 368). The new IP address (IPv) in the downlink message (step 366) is replaced with the IP address (IPd) of the TE (step 368).

Subsequent real-time (e.g., VoIP, etc.) messages from TE 122 to the rest of the GPRS system 100 are similarly intercepted by the MT 102 and the IP address (IPd) of TE 122 is replaced with the new IP address (IPv) before being transferred to the rest of the GPRS system 100 (steps 370-396). In the reverse direction, the messages meant for the new IP (IPv) address are modified by the MT 102 to carry the IP address (IPd) of the TE 122 in place of the new IP address (TPv, steps 370-396).

Multiple TBFs

Another aspect of an embodiment of the present invention makes use of multiple TBFs across the air interface to cater to real-time and non-real-time types of traffic. In this aspect, a TBF for acknowledged mode RLC and a TBF for unacknowledged mode RLC can be established in parallel. The two TBFs have different Temporary Flow Identifiers (TFI). The uplink (UL) allocation is based on the same Uplink State Flag (USF) and the MT 102 is able to efficiently manage its allocated resources based on the demand in the MT 102.

Radio Sub-System Differentiation

The GPRS system typically does not support radio sub-system participation in an admission control process. Accordingly, the GPRS system typically cannot differentiate among MTs 102 seeking admission because of real-time services (e.g., VoIP, etc.) or because of other packet data (e.g., web browsing, FTP, etc.) services. The radio sub-system is therefore forced to impose admission control limits for voice calls even where the SGSN 110 has accepted the appropriate PDP context.

In this aspect of an embodiment of the present invention, a scheme by which the radio sub-system can differentiate between users seeking different services and, hence, is able to judiciously distribute resources among real-time (e.g., voice, etc.) and other packet data (e.g., web browsing, FTP, etc.) services, advantageously, is provided. According to the invention, if the MT 102 requests to establish an up-link (UL) TBF in unacknowledged mode and with high radio priority, the BSS 108 considers such request as a TBF for real-time services (step 372). The radio sub-system then applies an admission control mechanism based on available resources for real-time services to accept or reject such a user. In the uplink direction, a fixed circuit-like channel assignment for each MT 102 supporting a real-time (e.g., voice, etc.) channel is provided.

The radio sub-system is responsible for limiting a number of real-time (e.g., voice, etc.) calls that are established within the radio resources assigned to a cell. This admission control is independent of the PDP context that is established between the MT 102 and the SGSN 110. The radio sub-system uses the request for an RLC Unacknowledged mode TBF in the uplink direction with the high radio priority (step 372) as a mechanism for recognizing the need to establish an uplink flow for the support of real-time (e.g., voice, etc.) traffic. The radio sub-system then allocates fixed uplink resources based on, for example, the vocoder rate supported by the system.

The radio sub-system implements a configured limit on the number of real-time (e.g., voice, etc.) traffic flows that are supported on a radio channel. This limit is less than the full channel capacity to ensure that some percentage of non-real-time traffic is accepted on the channel. By accepting non-real-time flows on the channel, greater resource utilization efficiency is achieved by allowing the non-real-time traffic to be multiplexed and made available during, for example, voice silence periods on the downlink. In addition, the radio sub-system scheduler has the flexibility to accommodate, for example, voice packet jitter that is introduced between the MGw 116 and the radio sub-system. Traffic multiplexing may not be possible on the uplink, where instead sufficient resources are provided to the MT 102 to support an established real-time (e.g., voice, etc.) call.

QoS-Based Real-Time Traffic Prioritization

The GPRS system typically treats downlink LLC PDUs based on the QoS attributes that are visible to the system. However, real-time (e.g., voice, etc.) packets have different requirement where they need guaranteed as well as periodic assignment of downlink time slots to carry their contents. This specialized treatment of real-time packets, however, is not available in typical GPRS systems.

In this aspect of an embodiment of the invention, a scheme allowing the BSS 108 to support prioritization of real-time traffic based on the specified QoS profile of each downlink packet is provided. According to the invention, when the LLC PDU indicates a RLC Unacknowledged mode transfer (step 378), the PDU is given the highest-level data scheduling priority across the radio interface (step 378). The Reliability Class 4 (and 5) is therefore reserved for real-time (e.g., voice, etc.) traffic. The Precedence Class is used to provide a second level of prioritization across both real-time traffic and non-real-time traffic. The real-time context is established using unacknowledged RLC (and LLC) mode Reliability Class and with highest Precedence Class.

In the downlink direction, the BSS 108 implements the necessary scheduling prioritization of real-time (e.g., voice, etc.) traffic based on the RLC unacknowledged mode indicator and the highest precedence class (step 378). A TBF that is established with RLC unacknowledged mode and the highest precedence class is recognized as supporting a packet real-time (e.g., voice, etc.) channel and is assigned channel resources to meet the expected real-time data rate. In the downlink direction, the BSS 108 allocates equivalent resources for the connection, but multiplexes non-real-time traffic during, for example, downlink voice silent periods.

Media Gateway Positioning

As previously described, the MT 102 is capable of deactivating an existing context and activating a new context suitable for real-time operation, for example, in order to carry voice (refer to the Dynamic QoS Provisioning section). In addition, the MT 102 is capable of establishing a parallel PDP context suitable for real-time operation, for example, in order to carry voice. This capability is based upon the MT 102 inspecting the transport layer address of the initial set-up messages that transpire between the client (the TE 122) and the server (the MGw 116, refer to the Simultaneous QoS Provisioning section).

These schemes, therefore, are universally applicable to calls that involve the MGw 116, even though the MGw 116 may be located outside a domain of a wireless operator. Many systems may require voice quality similar to that obtained in circuit switched systems and a service quality that is better predictable. Accordingly, the MGw 116 that supports, for example, VoIP in an external network sees a highly variable delay due to an external IP network, whose characteristics are not predictable.

However, because of the strict QoS principles that have to be maintained in the system for real-time (e.g., voice, etc.) services and consequent admission control principles, it might be necessary for operators to guarantee circuit switched type of QoS only for those calls that pass through the MGw 116 connected directly to the GGSN 112. By showing a Point of Presence (POP) to the PSTN 114 via the MGw 116, a predictable service quality (e.g., similar to the of the PSTN) can be achieved, as long as the wireless network under consideration has tight upper bounds on delay and packet loss.

In such scenarios, the MT 102 discriminates calls via the MGw 116 connected to the GGSN 112 from those calls via other external MGws. According to an embodiment of the present invention, the MT 102 inspects a destination IP address of set-up messages in the client-to-server direction and a source address in the server-to-client direction in order to achieve such discrimination. A new context is established if the IP address matches that of the MGw 116 connected directly to the GGSN 112. This scheme assumes that the MGw 116 connected to the GGSN 112 has a fixed IP address and that the MT 102 is aware of this fixed IP address.

For those systems where the MGw IP address can keep changing, the system 100 sends a DNS query for the MGw 116 to obtain the IP address and then invokes the appropriate PDP context. In an alternate embodiment, standard protocols that support Gateway Request (GRQ) messages for performing the same functions can be employed.

Differential QoS between Real-Time and Non-Real-Time Traffic

In a typical GPRS system, the TE gets one set of QoS attributes. These attributes are applied to all the applications that run on the TE. If a user runs both voice and data applications on the same TE, the applications can interfere with each other as the system is not able to differentiate between different flows of traffic destined for the same TE. Additionally, the resource utilization at the radio sub-system can be poor, as the system will end up giving preferential treatment to even data sessions of the TE as well.

Accordingly, the system 100 supports simultaneous real-time (e.g., voice, etc.) and non-real-time (e.g., data, web browsing, FTP, etc.) calls from the same TE 122 with a better utilization of radio resources than with the typical GPRS system. As specified in the Dynamic QoS Provisioning section, the system 100 initiates a new PDP context for real-time (e.g., voice, etc.) services. The real-time packets flow between MT 102 and the TE 122 on the new session, allowing the GPRS system 100 to provide differential treatment to real-time and non-real-time flows, as specified in the Radio Sub-System Differentiation and the QoS-Based Real-Time Traffic Prioritization sections. The differential treatment, advantageously, allows non-interference of a real-time flow by a non-real-time flow destined for the same TE 122.

Data Packet Header Compression

Figure 4A:
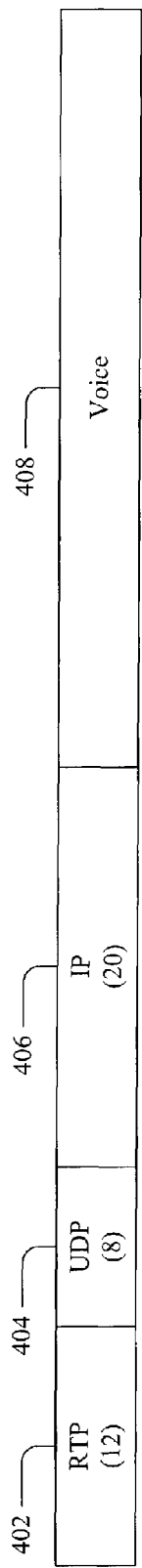
FIG. 4a is a diagram for illustrating an IP voice packet format.
Figure 4B:
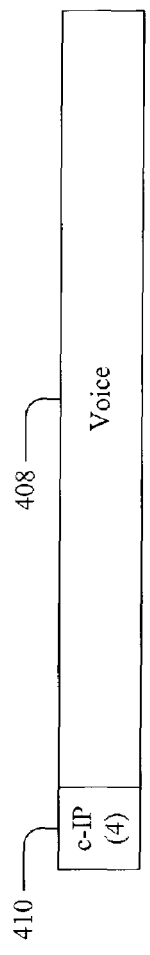
FIG. 4b is a diagram for illustrating a compressed IP voice packet format.

A real-time (e.g., VoIP, etc.) packet (e.g., transmitted between the MGw 116 and the GGSN 112), according to an embodiment of the present invention, includes, for example, 40 bytes of RTP 402, UDP 404 and IP 406 headers, as shown in FIG. 4a. However, using a header compression algorithm (e.g., Cisco's compressed RTP algorithm), the combined 40-byte RTP/UDP/IP packet headers are compressed into a header (c-IP) 410 having between two and four bytes, as shown in FIG. 4b (e.g., by the SGSN 110). This implies a maximum of 4 bytes of RTP/UDP/IP overhead during a data transmission phase of a real-time (e.g., voice, etc.) connection.

Figure 4C:
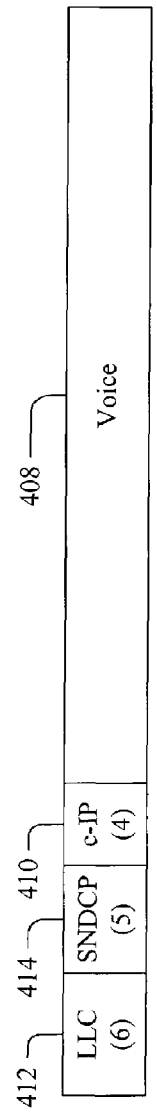
FIG. 4c is a diagram for illustrating a compressed IP voice packet format with GPRS overhead.

The overhead imposed by the individual layers of the GPRS system 100 architecture also contribute to bandwidth requirements of a real-time (e.g., voice, etc.) channel. Accordingly, FIG. 4c is a diagram, for example, for illustrating a compressed IP voice packet with GPRS overhead (e.g., transmitted between the SGSN 110 and the BSS 108). In FIG. 4c, the GPRS overhead for each LLC voice packet passed to the BSS 108 can be 11 bytes, including 5 bytes 414 of overhead at the Sub-Network Dependent Convergence Protocol (SNDCP) layer (GSM 04.65) and 6 bytes 412 at the LLC layer (GSM 04.64). In conjunction with the compressed IP (c-IP) header 410, this implies that the LLC voice packet to be delivered across the radio interface includes of up to 15 bytes of overhead, as shown in FIG. 4c.

According to an embodiment of the present invention, standard header compression/decompression can be implemented, for example, at the SGSN 110 and at the BSS 108. Accordingly, ciphering between the SGSN 110 and the MT 102 can be disabled so as to allow the BSS 108 to examine data that is flowing through the BSS 108. In addition, to ensure that the SNDCP layer within the SGSN 110 does not attempt to perform any further header or data compression, a procedure (e.g., a UT XID procedure, GSM 04.64) that negotiates the disabling of any header or data compression following the real-time (e.g., voice, etc.) PDP context activation can be employed.

As a further enhancement, the RTP 402/UDP 404/IP 406 headers between the BSS 108 and the MT 102 can be completely eliminated, according to an embodiment of the present invention, thereby achieving the same spectral efficiency, for example, for VoIP as that of circuit switched voice services. Under such an arrangement, the source and destination IP addresses are provided by the MT 102 to the BSS 108 in a separate message at the beginning of a real-time (e.g., voice, etc.) session that is used to establish the unacknowledged mode TBF.

In addition, due to the Time Division Multiple Access (TDMA) nature of the system 100 and because resources can be reserved periodically for real-time (e.g., voice, etc.) services, the sequence number and timestamps in, for example, the RTP header 402 (and the other headers 404 and 406) are incremented in a known manner. For example, for a TDMA system 100 having TDMA frames of duration of 40 ms and when a timeslot is allocated for real-time (e.g., voice, etc.) traffic in every TDMA frame, the sequence number in the RTP header 402 is incremented every TDMA frame by 1 and the timestamp in the RTP header 102 is incremented every TDMA frame by 320 (e.g., for an 8 kHz sampling rate of a speech signal). In a similar manner, the UDP 404 and the IP 406 headers also can be eliminated between the between the BSS 108 and the MT 102.

Service Charges Based on Packets Transferred

In general, a real-time call, for example, a voice call, is charged based on the duration of the call. Therefore, the user is charged for any silence periods between the calls. However, in a packet data system, resources are provided to a user only when needed. Accordingly, during silence periods the resources are free to be allocated to other users.

For example, VoIP can be used to support a voice call over a network that has packet based transmission technology underneath. In such a scenario, according to an embodiment of the present invention, a user is charged based on the packets transferred for the real-time call and any specialized QoS used by the GPRS system 100 for the real-time call.

In a cellular environment, a call charge has an air time component and a toll component. The toll component comes into play where the calling party is outside a normal coverage area of the cellular operator. According to an embodiment of the present invention, however, the user in such a cellular environment can use the GPRS system 100 to support a real-time (e.g., VoIP, etc.) call. In such a scenario, according to an embodiment of the present invention, the user is charged for the air time based on packets transferred in each direction along with QoS attributes that the network uses to support the real-time call.

In this way, a user is charged only for the duration that the allocated resources are used and is not charged for any silence periods that are inherent in, for example, a voice call. Such resource utilization takes into account resource utilized in each direction (i.e., transmit and receive directions).

Exemplary Machine Architecture

The system 100 can store information relating to various processes described herein. This information can be stored in one or more memories, such as a hard disk, optical disk, magneto-optical disk, RAM, etc., of the system 100 One or more databases of the devices and subsystems of the system 100 of FIG. 1 can store the information used to implement the embodiments of the present invention. The databases can be organized using data structures (e.g., records, tables, arrays, fields, graphs, trees, and/or lists) included in one or more memories, such as the memories listed above or any of the storage devices listed below in the discussion of FIG. 5, for example.

The previously described processes can include appropriate data structures for storing data collected and/or generated by the processes of the system 100 of FIG. 1 in one or more databases thereof. Such data structures accordingly can include fields for storing such collected and/or generated data. In a database management system, data can be stored in one or more data containers, each container including records, and the data within each record can be organized into one or more fields. In relational database systems, the data containers can be referred to as tables, the records can be referred to as rows, and the fields can be referred to as columns. In object-oriented databases, the data containers can be referred to as object classes, the records can be referred to as objects, and the fields can be referred to as attributes. Other database architectures can be employed and use other terminology. Systems that implement the embodiments of the present invention are not limited to any particular type of data container or database architecture.

All or a portion of the system 100 (e.g., as described with respect to FIGS. 1-4) can be conveniently implemented using one or more conventional general purpose computer systems, microprocessors, digital signal processors, micro-controllers, etc., programmed according to the teachings of the embodiments of the present invention (e.g., using the computer system of FIG. 5), as will be appreciated by those skilled in the computer and software art(s). Appropriate software can be readily prepared by programmers of ordinary skill based on the teachings of the present disclosure, as will be appreciated by those skilled in the software art. Further, the system 100 can be implemented on the World Wide Web (e.g., using the computer system of FIG. 5). In addition, the system 100 (e.g., as described with respect to FIGS. 1-4) can be implemented by the preparation of application-specific integrated circuits or by interconnecting an appropriate network of conventional component circuits, as will be appreciated by those skilled in the electrical art(s).

Figure 5:
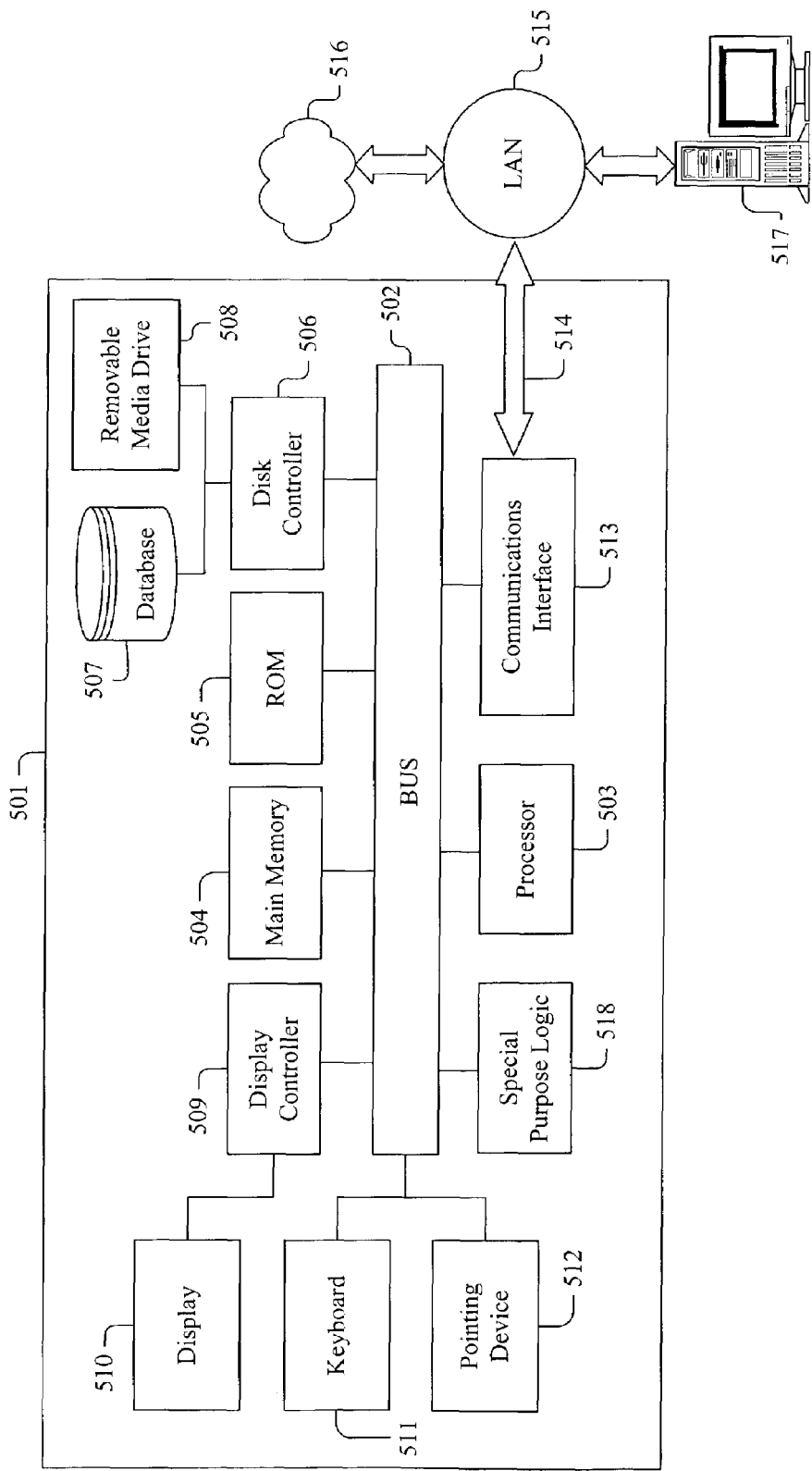
FIG. 5 is an exemplary computer system, which can be programmed to perform one or more of the processes of the embodiments of the present invention.

FIG. 5 illustrates a computer system 501 upon which the embodiments of the present invention (e.g., the device and subsystems of the system 100 of FIG. 1) can be implemented. The embodiments of the present invention can be implemented on a single such computer system, or a collection of multiple such computer systems. The computer system 501 can include a bus 502 or other communication mechanism for communicating information, and a processor 503 coupled to the bus 502 for processing the information. The computer system 501 also can include a main memory 504, such as a random access memory (RAM), other dynamic storage device (e.g., dynamic RAM (DRAM), static RAM (SRAM), synchronous DRAM (SDRAM)), etc., coupled to the bus 502 for storing information and instructions to be executed by the processor 503. In addition, the main memory 504 also can be used for storing temporary variables or other intermediate information during the execution of instructions by the processor 503. The computer system 501 further can include a read only memory (ROM) 505 or other static storage device (e.g., programmable ROM (PROM), erasable PROM (EPROM), electrically erasable PROM (EEPROM), etc.) coupled to the bus 502 for storing static information and instructions.

The computer system 501 also can include a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices can be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 also can include special purpose logic devices 518, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, TE 122 functions, voice handset 124 functions, MT 102 functions, satellite 104 functions, RFT 108 functions, BTS 118 functions, BSS 108 functions, SGSN 110 functions, GGSN 112 functions, MGw 116 functions, SGw/SoftSwitch 126 functions, MM 130 functions, MSC 128 functions, etc.

The computer system 501 also can include a display controller 509 coupled to the bus 502 to control a display 510, such as a cathode ray tube (CRT), liquid crystal display (LCD), active matrix display, plasma display, touch display, etc., for displaying or conveying information to a computer user. The computer system can include input devices, such as a keyboard 511 including alphanumeric and other keys and a pointing device 512, for interacting with a computer user and providing information to the processor 503. The pointing device 512 can include, for example, a mouse, a trackball, a pointing stick, etc., or voice recognition processor, etc., for communicating direction information and command selections to the processor 503 and for controlling cursor movement on the display 510. In addition, a printer can provide printed listings of the data structures/information of the system shown in FIG. 1, or any other data stored and/or generated by the computer system 501.

The computer system 501 can perform a portion or all of the processing steps of the invention in response to the processor 503 executing one or more sequences of one or more instructions contained in a memory, such as the main memory 504. Such instructions can be read into the main memory 504 from another computer readable medium, such as a hard disk 507 or a removable media drive 508. Execution of the arrangement of instructions contained in the main memory 504 causes the processor 503 to perform the process steps described herein. One or more processors in a multi-processing arrangement also can be employed to execute the sequences of instructions contained in main memory 504. In alternative embodiments, hard-wired circuitry can be used in place of or in combination with software instructions. Thus, embodiments are not limited to any specific combination of hardware circuitry and/or software.

Stored on any one or on a combination of computer readable media, the embodiments of the present invention can include software for controlling the computer system 501, for driving a device or devices for implementing the invention, and for enabling the computer system 501 to interact with a human user (e.g., users of the system 100 of FIG. 1, etc.). Such software can include, but is not limited to, device drivers, operating systems, development tools, and applications software. Such computer readable media further can include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

The computer system 501 also can include a communication interface 513 coupled to the bus 502. The communication interface 513 can provide a two-way data communication coupling to a network link 514 that is connected to, for example, a local area network (LAN) 515, or to another communications network 516, such as the Internet. For example, the communication interface 513 can include a digital subscriber line (DSL) card or modem, an integrated services digital network (ISDN) card, a cable modem, a telephone modem, etc., to provide a data communication connection to a corresponding type of telephone line. As another example, communication interface 513 can include a local area network (LAN) card (e.g., for Ethernet™, an Asynchronous Transfer Model (ATM) network, etc.), etc., to provide a data communication connection to a compatible LAN. Wireless links can also be implemented. In any such implementation, communication interface 513 can send and receive electrical, electromagnetic, or optical signals that carry digital data streams representing various types of information. Further, the communication interface 513 can include peripheral interface devices, such as a Universal Serial Bus (USB) interface, a PCMCIA (Personal Computer Memory Card International Association) interface, etc.

The network link 514 typically can provide data communication through one or more networks to other data devices. For example, the network link 514 can provide a connection through local area network (LAN) 515 to a host computer 517, which has connectivity to a network 516 (e.g. a wide area network (WAN) or the global packet data communication network now commonly referred to as the "Internet") or to data equipment operated by service provider. The local network 515 and network 516 both can employ electrical, electromagnetic, or optical signals to convey information and instructions. The signals through the various networks and the signals on network link 514 and through communication interface 513, which communicate digital data with computer system 501, are exemplary forms of carrier waves bearing the information and instructions.

The computer system 501 can send messages and receive data, including program code, through the network(s), network link 514, and communication interface 513. In the Internet example, a server (not shown) can transmit requested code belonging to an application program for implementing an embodiment of the present invention through the network 516, LAN 515 and communication interface 513. The processor 503 can execute the transmitted code while being received and/or store the code in storage devices 507 or 508, or other non-volatile storage for later execution. In this manner, computer system 501 can obtain application code in the form of a carrier wave. With the system of FIG. 5, the embodiments of the present invention can be implemented on the Internet as a Web Server 501 performing one or more of the processes according to the embodiments of the present invention for one or more computers coupled to the Web server 501 through the network 516 coupled to the network link 514.

The term "computer readable medium" as used herein can refer to any medium that participates in providing instructions to the processor 503 for execution. Such a medium can take many forms, including but not limited to, non-volatile media, volatile media, transmission media, etc. Non-volatile media can include, for example, optical or magnetic disks, magneto-optical disks, etc., such as the hard disk 507 or the removable media drive 508. Volatile media can include dynamic memory, etc., such as the main memory 504. Transmission media can include coaxial cables, copper wire and fiber optics, including the wires that make up the bus 502. Transmission media can also take the form of acoustic, optical, or electromagnetic waves, such as those generated during radio frequency (RF) and infrared (IR) data communications.

As stated above, the computer system 501 can include at least one computer readable medium or memory for holding instructions programmed according to the teachings of the invention and for containing data structures, tables, records, or other data described herein. Common forms of computer-readable media can include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to either of networks 515 and 516. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a personal digital assistant (PDA), a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

Although the present invention is described in terms of applicability to the GPRS, the present invention can be practiced in other radio systems, as will be appreciated by those skilled in the relevant art(s).

While the present invention have been described in connection with a number of embodiments and implementations, the present invention is not so limited but rather covers various modifications and equivalent arrangements, which fall within the purview of the appended claims.

What is claimed is:

1. A method for providing communications services, comprising:

determining a type of communications service present in a communications session based on the quality of service parameters assigned for the communications session, wherein the types of communications services include real-time voice over Internet Protocol (IP) services, and non-real-time data services;

adjusting the quality of service parameters based on a different type of communications service requested;

handling both data services and voice over IP services under a single set of quality of service parameters; and informing a base station of establishment of the voice over IP services upon detection of an ensuing voice over IP call in a separate message.

2. The method of claim 1, further comprising: inspecting a transport address of a message from a terminal equipment to a mobile terminal to determine the ensuing voice over IP call.

3. A method for providing communications services, comprising:

determining a type of communications service present in a communications session based on the quality of service parameters assigned for the communications session, wherein the types of communications services include real-time voice over Internet Protocol (IP) services, and non-real-time data services;

adjusting the quality of service parameters based on a different type of communications service requested; and concurrently provisioning quality of service parameters for both voice over IP services and data services over the communications system, including, generating a voice IP address for voice over IP communications between a mobile terminal and a communications system, employing a device IP address of a terminal equipment for voice over IP or data communications between the mobile terminal and the terminal equipment, and employing the device IP address for data communications between the mobile terminal and the communications system.

4. The method of claim 3, further comprising:

activating first quality of service parameters comprising a first packet data protocol context applicable to the data services based on the device IP address, and activating second quality of service parameters comprising a second packet data protocol context applicable to the voice over IP services based on the IP address for voice over IP.

5. A method for providing communications services, comprising:

determining a type of communications service present between a mobile terminal and a communications system in a communications session based on the quality of service parameters assigned for the communications session, wherein the types of communications services include real-time voice over Internet Protocol (IP) services, and non-real-time data services;

adjusting the quality of service parameters based on a different type of communications service requested; and generating different temporary block flows for voice over IP services and data services, respectively, including, generating, in parallel, a first temporary block flow for an acknowledged mode radio link control transport and a second temporary block flow for an unacknowledged mode radio link control transport.

6. The method of claim 5, further comprising: generating different temporary flow identifiers for the first and second temporary block flows.

7. A method for providing communications services, comprising:

determining a type of communications service present in a communications session based on the quality of service parameters assigned for the communications session, wherein the types of communications services include real-time voice over Internet Protocol (IP) services, and non-real-time data services;

adjusting the quality of service parameters based on a different type of communications service requested; and determining that a temporary block flow is requesting the voice over IP services, if a temporary block flow is requested to be established in an unacknowledged radio link control transport mode and a high radio priority mode.

8. The method of claim 7, further comprising: applying an admission control mechanism based on available resources for the voice over IP services to one of accept and reject the requested voice over IP services.

9. The method of claim 7, further comprising: generating a highest level of data-scheduling priority over a communications system for the unacknowledged radio link control transport mode.

10. The method of claim 7, further comprising: multiplexing data packets for data services during silence intervals in the voice over IP services.

11. A method for providing communications services, comprising:

determining a type of communications service present in a communications session based on the quality of service parameters assigned for the communications session, wherein the types of communications services include real-time voice over Internet Protocol (IP) services, and non-real-time data services;

adjusting the quality of service parameters based on a different type of communications service requested; and assigning packets having an unacknowledged radio link control transport mode higher priority than packets having an acknowledged radio link control transport mode.

12. The method of claim 11, further comprising: assigning voice over IP channel resources to the packets having the unacknowledged radio link control transport mode.

* * * * *